(12) United States Patent
Kato et al.

(10) Patent No.: US 12,334,282 B2
(45) Date of Patent: Jun. 17, 2025

(54) INPUT DEVICE AND INPUT SYSTEM

(71) Applicant: Wacom Co., Ltd., Saitama (JP)

(72) Inventors: So Kato, Saitama (JP); Katsuhito Obi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 186 days.

(21) Appl. No.: 18/352,649

(22) Filed: Jul. 14, 2023

(65) Prior Publication Data
US 2023/0360870 A1 Nov. 9, 2023

Related U.S. Application Data

(63) Continuation of application No. PCT/JP2022/005308, filed on Feb. 10, 2022.

(30) Foreign Application Priority Data

Feb. 17, 2021 (JP) .................. 2021-023248

(51) Int. Cl.
*H01H 25/04* (2006.01)
*G05G 5/05* (2006.01)
(Continued)

(52) U.S. Cl.
CPC ............... *H01H 25/04* (2013.01); *G05G 5/05* (2013.01); *G05G 9/047* (2013.01); *G06F 3/0338* (2013.01);
(Continued)

(58) Field of Classification Search
CPC .......... H01H 25/04; G05G 5/05; G05G 9/047; G06F 3/041; G06F 3/338
See application file for complete search history.

(56) References Cited

U.S. PATENT DOCUMENTS 5,214,428 A * 5/1993 Allen ..................... G06V 10/17
250/221
5,751,229 A * 5/1998 Funahashi ............... G06F 3/046
178/18.05
(Continued)

FOREIGN PATENT DOCUMENTS

JP 10-254567 A 9/1998
JP 2008-3704 A 1/2008

OTHER PUBLICATIONS

International Search Report mailed Apr. 19, 2022, for International Patent Application No. PCT/JP2022/005308. (5 pages)(with English Translation).

*Primary Examiner* — Scott Bauer
(74) *Attorney, Agent, or Firm* — Seed IP Law Group LLP (57) ABSTRACT

An input device is provided, which includes an operation shaft and a case configured to house the operation shaft such that a tilting operation to tilt an axial direction of the operation shaft to a desired direction can be performed. A coil constituting a resonant circuit for performing signal interaction through electromagnetic induction coupling with a position detection sensor is housed in the operation shaft, such that a direction of magnetic flux penetrating the coil is in the axial direction of the operation shaft. The operation shaft can be tilted to a desired direction within the case, with a predetermined position between a first end side and a second end side of the operation shaft in the axial direction of the operation shaft serving as a rotation center, so that a direction of tilt of the operation shaft and a magnitude of an angle of the tilt are detected.

19 Claims, 7 Drawing Sheets

(51) Int. Cl.
*G05G 9/047* (2006.01)
*G06F 3/0338* (2013.01)
*G06F 3/044* (2006.01)

(52) U.S. Cl.
CPC ............. *G05G 2009/04774* (2013.01); *G05G 2505/00* (2013.01)

(56) References Cited

U.S. PATENT DOCUMENTS

| | | | |
|---|---|---|---|
| 7,319,458 B2* | 1/2008 | An | G06F 3/046 345/161 |
| 2013/0249830 A1* | 9/2013 | Quek | G06F 3/0393 345/173 |
| 2015/0261297 A1* | 9/2015 | Quek | G06F 3/04886 345/174 |
| 2018/0039345 A1* | 2/2018 | Obata | G06F 3/03545 |
| 2018/0095556 A1* | 4/2018 | Ho | G06F 3/016 |

* cited by examiner

INPUT DEVICE AND INPUT SYSTEM

BACKGROUND

Technical Field

The present disclosure relates to an input device that gives directional indications and that, for example, is suitable for use as a joystick controller for games, and an input system using such input device.

Description of the Related Art

As joystick controllers, the ones disclosed in Japanese Patent Laid-Open No. Hei 10-254567 (Patent Document 1) and Japanese Patent Laid-Open No. 2008-3704 (Patent Document 2), for example, have been conventionally known. Conventional joystick controllers disclosed in Patent Documents 1 and 2 include an operation shaft, a rotation support mechanism, and first and second detection sections that are disposed within a case. The operation shaft is housed in the case such that a tilting operation of the operation shaft (hereinafter also referred to as a "tilt operation") can be performed. The rotation support mechanism supports the operation shaft such that the operation shaft is rotatable in response to the tilting operation of the operation shaft. The first and second detection sections are coupled to the rotation support mechanism in the case to detect the movement of the operation shaft in an X-axis operation direction and in a Y-axis operation direction, and output the detection signals (e.g., detected voltages).

In Patent Document 1, the first and second detection sections include rotary potentiometers, and their electrical resistance values change according to the tilt operation of the operation shaft. In Patent Document 2, the first and second detection sections include a magnet and a magnetic sensor and are configured to acquire, from the magnetic sensor, an electrical output corresponding to the tilt operation of the operation shaft, on the basis of a change in a relative positional relation between the magnet and the magnetic sensor in response to the tilt operation of the operation shaft.

Further, conventional joystick controllers are connected to a connector that serves as an electrical circuit contact point disposed on a control board.

A problem is that the above-described conventional joystick controllers have a mechanically complex configuration to include, within the case, the rotation support mechanism supporting the operation shaft in a rotatable manner and the first and second detection sections coupled to the rotation support mechanism.

In the case of the structure in which the rotary potentiometers are used, as with Patent Document 1, a variable resistance part and a contact unit constantly rub against each other while operating. This may potentially cause electrical circuit damage such as contact failure due to wear and contamination of foreign matters, making it impossible to correctly detect the angle of the tilt of the operation shaft.

As with Patent Document 2, in the case of acquiring an output corresponding to the tilt operation of the operation shaft on the basis of a magnetic coupling using the magnet and the magnetic sensor, one of the magnet and the magnetic sensor needs to be coupled to a rotary mechanism part that is coupled to the rotation support mechanism supporting the operation shaft in a rotatable manner. In this rotary mechanism part, a mechanical damage may potentially occur, making it impossible to correctly detect the angle of the tilt of the operation shaft.

Further, as described above, the conventional joystick controllers are mounted and configured on the control board. This structure has a disadvantage in that the installation position cannot be changed.

BRIEF SUMMARY

Therefore, it is desirable to provide an input device that can solve the above-described problem.

An input device is provided, which includes an operation shaft and a case housing the operation shaft such that an operation of tilting an axial direction of the operation shaft to a desired direction can be performed. A coil constituting a resonant circuit for performing signal interaction through electromagnetic induction coupling with a position detection sensor is housed in the operation shaft such that a direction of magnetic flux penetrating the coil is in the axial direction of the operation shaft. The operation shaft can be tilted to a desired direction within the case, with a predetermined position between a first end side and a second end side of the operation shaft in the axial direction of the operation shaft serving as a rotation center, so that a direction of tilt of the operation shaft and a magnitude of an angle of the tilt are detected on the basis of a positional displacement of the first end side of the operation shaft in the axial direction, wherein the position displacement is detected via the position detection sensor through the signal interaction.

The input device with the configuration described above is configured to be mountable on the position detection sensor, which is a separate unit from the input device.

In the input device, moreover, in the operation shaft housed within the case such that the operation of tilting the axial direction of the operation shaft to a desired direction can be performed, the coil constituting the resonant circuit for performing the signal interaction through the electromagnetic induction coupling with the position detection sensor is housed such that the direction of the magnetic flux penetrating the coil is in the axial direction of the operation shaft.

Further, the operation shaft is configured to rotate about the predetermined position serving as the rotation center between the first end side and the second end side of the operation shaft in the axial direction of the operation shaft, and to be tilted to a desired direction within the case. Therefore, when the operation shaft is tilted, the position of the first end side of the operation shaft in the axial direction to be detected via the position detection sensor through the signal interaction is displaced. On the basis of the positional displacement, the direction of the tilt of the operation shaft and the magnitude of the angle of the tilt are detected.

DETAILED DESCRIPTION

First Embodiment

An input device and an input system using the input device according to a first embodiment of the present disclosure are described with reference to the drawings.

Figure 1:
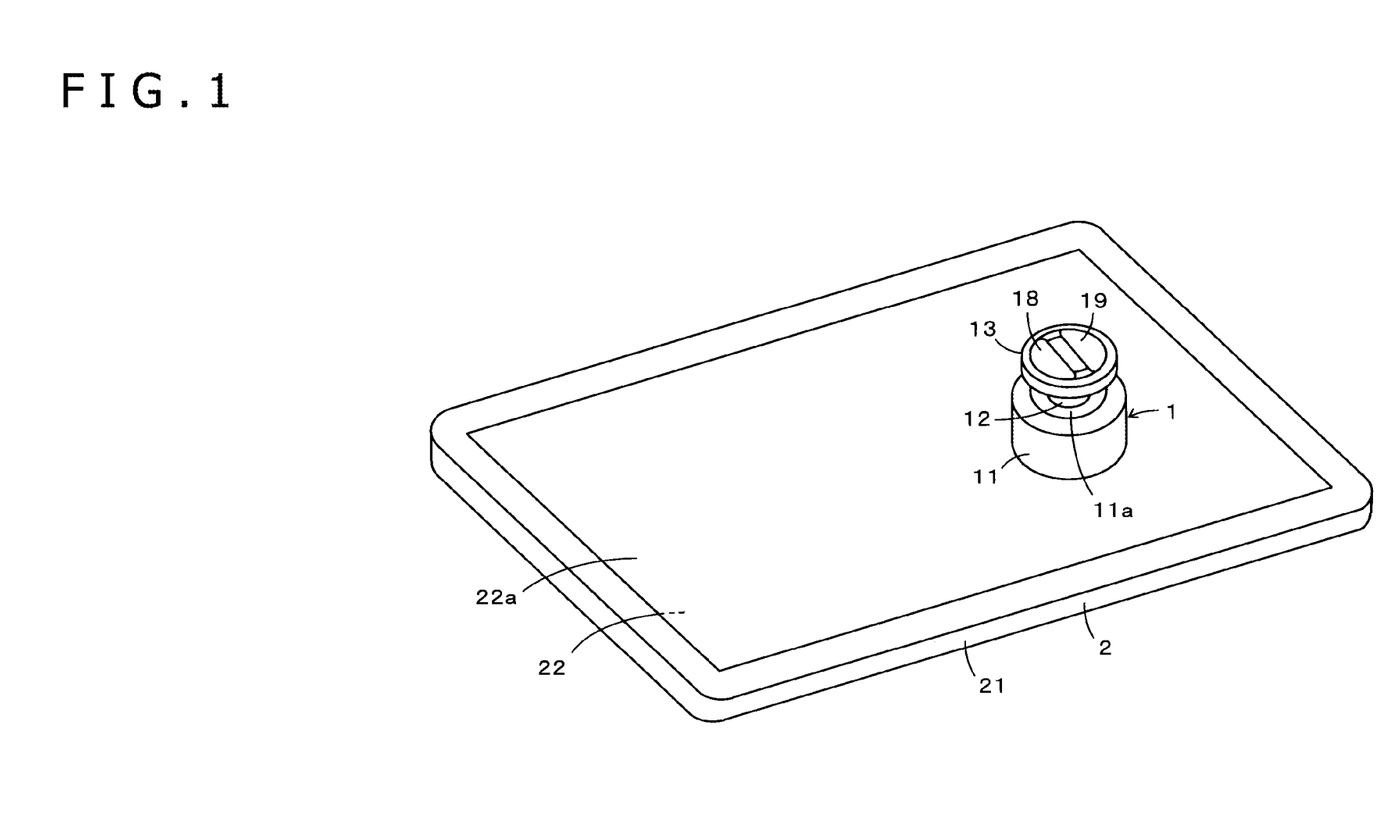
FIG. 1 is a view describing an overview of an example of a configuration of an input device and an input system according to a first embodiment of the present disclosure.

FIG. 1 is a view describing an overview of the input system according to the first embodiment of the present disclosure. The input system according to the first embodiment of the present disclosure includes an input device 1 according to the first embodiment and an operation information output device 2, which outputs operation information corresponding to a user operation of the input device 1.

The operation information output device 2 includes, in this example, a position detection sensor 22 of an electromagnetic induction system in a thin plate-like housing 21 and an input surface 22a, which is formed on a surface of the housing 21 and corresponds to a position detection region of the position detection sensor 22. The input surface 22a is a flat surface. In the input system according to the present embodiment, the input device 1 is mounted at any position on the input surface 22a when used.

In this example, the input device 1 is housed in a case 11, which is cylindrical in appearance and hollow inside, such that an axial direction of an operation shaft 12 is in a centerline direction of the cylindrical case 11 and such that an operation of tilting the axial direction of the operation shaft 12 to a desired direction can be performed. The operation shaft 12 protrudes outwardly through an opening 11a, which is formed in an upper part of the case 11, and a gripping operation part 13 is attached to the protruding part to allow the user to perform the operation of tilting the operation shaft 12.

As described later, a coil constituting a resonant circuit for performing signal interaction through electromagnetic induction coupling with the position detection sensor 22 is disposed in the operation shaft 12 of the input device 1, and the position of a first end side of the operation shaft 12 in the axial direction within the case 11 is detectable through the position detection sensor 22.

In the present embodiment, the input device 1 is configured such that the position of the first end side of the operation shaft 12 in the axial direction changes in response to a user's operation of tilting the operation shaft 12. Further, the operation information output device 2 is configured to be able to detect the change in the position of the first end side of the operation shaft 12 of the input device 1 in the axial direction and detect, on the basis of the detected positional change, the direction and the magnitude of the tilt of the operation shaft 12 of the input device 1. Further, the operation information output device 2 is configured to generate operation information including the detected direction and the magnitude of the tilt of the operation shaft 12 of the input device 1 and transmit the operation information to, for example, a game machine main unit or a personal computer wirelessly. Needless to say, the operation information from the operation information output device 2 may be transmitted to the game machine main unit or the personal computer through wired communication using a cable.

Examples of configurations of the input device 1 and the operation information output device 2 are described below.

Example of Configuration of Input Device 1

Figure 2A:
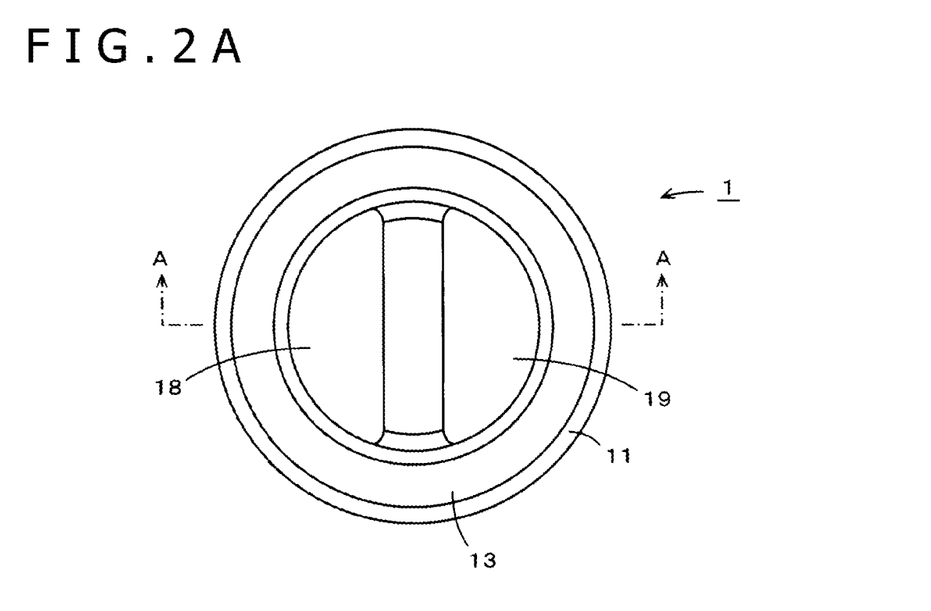
FIGS. 2A and 2B are views describing an example of a configuration of the input device according to the first embodiment of the present disclosure.
Figure 2B:
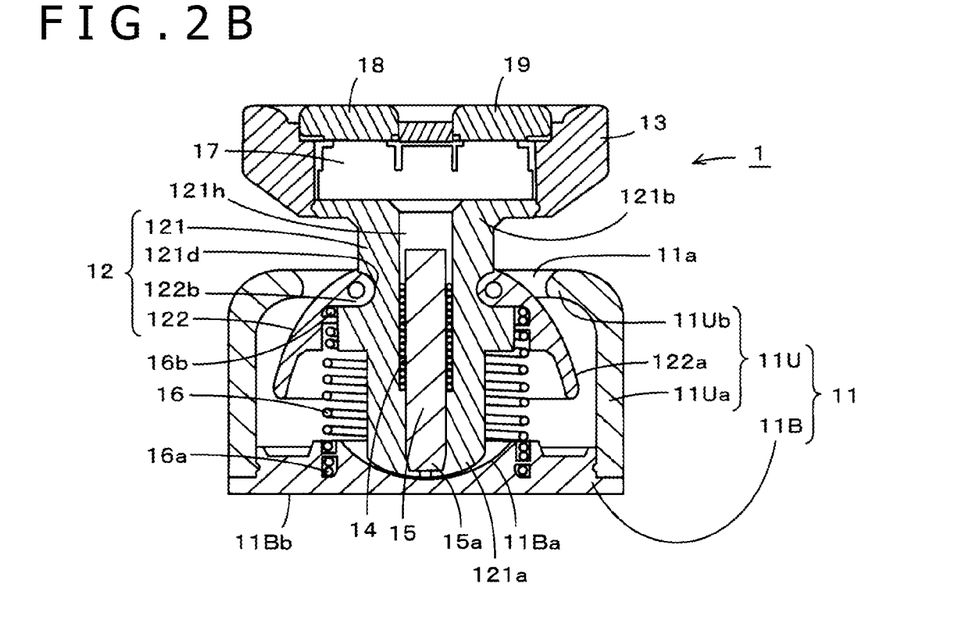

FIGS. 2A and 2B are views describing an example of a configuration of the input device 1. FIG. 2A is a top view of the input device 1. FIG. 2B is a longitudinal cross-sectional view of the input device 1 taken along line A-A of FIG. 2A.

As illustrated in FIG. 2B, the case 11 of the input device 1 is made of a non-magnetic material such as resin. A lower case 11B and an upper case 11U are fitted together to form the case 11, which is, in this example, cylindrical in appearance and has a hollow space inside.

The lower case 11B has a circular plate-like body and forms a bottom part of the case 11. A surface of the lower case 11B facing the opening 11a of the case 11 includes a bearing part 11Ba, which supports a first end 121a side of an operation shaft main body 121 of the operation shaft 12 in the axial direction. An externally exposed surface 11Bb of the lower case 11B, which is on the side opposite from the surface of the lower case 11B facing the opening 11a of the case 11, is a bottom surface of the case 11. In this example, the surface 11Bb (hereinafter referred to as a bottom surface 11Bb), which constitutes the bottom surface of the case 11, is a flat surface, so that the input device 1 does not rattle on the input surface 22a when the input device 1 is mounted on the flat input surface 22a of the operation information output device 2.

In the present embodiment, the selection of the material of the lower case 11B of the input device 1 and/or the surface treatment of the bottom surface 11Bb and the selection of the material of the input surface 22a of the operation information output device 2 and/or the surface treatment of the input surface 22a of the operation information output device 2 are performed such that, when the input device 1 is mounted on the input surface 22a of the operation information output device 2, the input device 1 does not easily move in a direction parallel to the input surface 22a due to a frictional force generated between the bottom surface 11Bb of the lower case 11B and the input surface 22a of the operation information output device 2.

A cylindrical wall plate 11Ua and an upper part 11Ub are integrally formed to constitute the upper case 11U. The cylindrical wall plate 11Ua is fitted to the periphery of the lower case 11B and is formed to extend perpendicularly to the periphery of the lower case 11B. The upper part 11Ub has the opening 11a, which faces the bottom part constituted by the lower case 11B, via the hollow space. The opening 11a is formed in a central portion of the upper part 11Ub of the upper case 11U. The diameter of the opening 11a is larger than the diameter of the operation shaft 12 and is determined such that the opening 11a does not contact the operation shaft 12 even when the operation shaft 12 is tilted by the maximum operation angle.

As illustrated in FIG. 2B, the operation shaft 12 includes the operation shaft main body 121 and an operation shaft cover 122 in the present embodiment. The operation shaft main body 121 and the operation shaft cover 122 are made of a non-magnetic material, in this example, resin.

The operation shaft main body 121 has a cylindrical rod shape with a length in the axial direction longer than the length from a surface of the bearing part 11Ba of the lower case 11B of the case 11 to an outer surface of the upper part 11Ub of the upper case 11U of the case 11. The first end 121a side of the operation shaft main body 121 in the axial direction is on the first end side of the operation shaft 12 in the axial direction, and a second end 121b side of the operation shaft main body 121 in the axial direction is on the second end side of the operation shaft 12 in the axial direction.

As illustrated in FIG. 2B, in the state in which the operation shaft 12 is housed in the case 11, a tip of the first end 121a side of the operation shaft main body 121 in the axial direction of the operation shaft main body 121 abuts against the bearing part 11Ba of the lower case 11B to be supported by the bearing part 11Ba. The second end 121b side of the operation shaft main body 121 in the axial direction externally protrudes from the opening 11a of the upper part 11Ub of the upper case 11U of the case 11. The gripping operation part 13, which has a disk-like shape, is attached to this externally protruding second end 121b side of the operation shaft main body 121 in the axial direction.

As illustrated in FIG. 2B, the operation shaft main body 121 has a recessed hole 121h, which extends from the second end 121b in the axial direction to the vicinity of the tip of the first end 121a. In this recessed hole 121h, a coil 14, which constitutes the resonant circuit that is electromagnetically coupled to the position detection sensor 22 of the electromagnetic induction system, is fixedly housed. In this case, the coil 14 is fixedly housed such that a direction of the magnetic flux penetrating the coil 14 is in the axial direction of the operation shaft main body 121, that is, the axial direction of the operation shaft 12.

In this example, the coil 14, which is wound around a rod-shaped magnetic core, e.g., a ferrite core 15, is fixedly housed in the recessed hole 121h of the operation shaft main body 121. In this case, the ferrite core 15 is fixedly housed in the recessed hole 121h such that a first end 15a side of the ferrite core 15 in an axial direction of the ferrite core 15 is positioned in the vicinity of the first end 121a side of the operation shaft main body 121 in the axial direction of the operation shaft main body 121.

In the present embodiment, as illustrated in FIG. 2B, the tip of the first end 121a side of the operation shaft main body 121 has a convex curved surface with a predetermined first curvature. The bearing part 11Ba of the lower case 11B, which constitutes a bottom plate of the case 11, has a recessed curved surface with a second curvature that is the same as or greater than the first curvature of the convex curved surface of the operation shaft 12. In this case, in the present embodiment, each of the convex curved surface of the tip of the first end 121a of the operation shaft main body 121 and the recessed curved surface of the bearing part 11Ba of the lower case 11B has a curved surface that is part of a sphere.

In the present embodiment, as illustrated in FIG. 2B, the operation shaft main body 121 and the operation shaft cover 122 are coupled to each other at a position that is toward the second end 121b side than a central portion in the axial direction of the operation shaft main body 121. The coupling position in the axial direction is approximately the same position as the opening 11a when the operation shaft 12 is housed in the case 11. The operation shaft cover 122 has an umbrella-like shape with the operation shaft main body 121 serving as a central position, and is curved and radially overhangs in an oblique direction that intersects the axial direction of the operation shaft main body 121 and that is toward the bottom part in the case 11.

The operation shaft cover 122 has a curved surface 122a, which overhangs like an umbrella. The shape of this curved surface 122a is not a true spherical shape, but a surface shape of a spheroid whose longitudinal direction is the axial direction of the operation shaft main body 121. This structure prevents the operation shaft cover 122 and a circular edge of the opening 11a of the upper case 11U from rubbing against each other when the operation shaft 12 is tilted in the case 11.

Although the operation shaft main body 121 and the operation shaft cover 122 may be configured as a single unit, the operation shaft main body 121 and the operation shaft cover 122 are separate units in the present embodiment. In this example, the operation shaft main body 121 and the operation shaft cover 122 are coupled to each other such that the operation shaft main body 121 can freely rotate with respect to the operation shaft cover 122 with an axial center of the operation shaft main body 121 as a rotation center. Specifically, as illustrated in FIG. 2B, a ring-shaped recessed groove 121d is formed in a peripheral side surface of the operation shaft main body 121 in the portion where the operation shaft main body 121 is coupled to the operation shaft cover 122. The operation shaft cover 122 has a ring-shaped expansion part 122b, which is loosely fitted into this ring-shaped recessed groove 121d. In this case, the size of the ring-shaped recessed groove 121d is slightly larger than that of the ring-shaped expansion part 122b. With this configuration, the operation shaft cover 122 is loosely fitted into the operation shaft main body 121, and they are coupled to each other in such a manner as to be rotatable with respect to each other.

The operation shaft 12 is supported such that, when an operation force for tilting the operation shaft 12 is applied to the gripping operation part 13, the operation shaft 12 rotates about a rotation center position, which is an intermediate position between the first end 121a side and the second end 121b side in the axial direction of the operation shaft main body 121. The operation shaft 12 is thereby tilted in the hollow space of the case 11 and the position of the first end 121a side of the operation shaft 12 in the axial direction changes on the bearing part 11Ba of the lower case 11B, which constitutes the bottom part of the case 11.

In the present embodiment, the operation shaft 12 is supported by a coil spring 16, which is elastically compressible, in such a manner as to be tilted and displaced in the case 11. Specifically, the coil spring 16 has a winding diameter larger than the diameter of the operation shaft main body 121. As illustrated in FIG. 2B, in the state in which the operation shaft main body 121 is housed inside the coil spring 16, a first end 16a side of the coil spring 16 is fixed to the lower case 11B, which constitutes the bottom part of the case 11, while a second end 16b side of the coil spring 16 is fixed to the second end side of the operation shaft 12 in the axial direction.

In the present embodiment, however, the second end 16*b* side of the coil spring 16 is fixed not to the operation shaft main body 121 of the operation shaft 12, but to the operation shaft cover 122, as illustrated in FIG. 2B. Therefore, even though the operation shaft 12 is supported by the case 11 with the help of the coil spring 16, the operation shaft main body 121 is not directly coupled to the coil spring 16. Therefore, even when the user performs an operation for intentionally rotating the gripping operation part 13 about the axial direction of the operation shaft 12 to twist the operation shaft 12, the coil spring 16 is not twisted because the operation shaft main body 121 rotates freely with respect to the operation shaft cover 122. Therefore, the coil spring 16 is not damaged by the operation for twisting the operation shaft 12.

The second end 16*b* side of the coil spring 16 may be free without being fixed to the operation shaft main body 121 or the operation shaft cover 122. In this case, since the second end 16*b* side of the coil spring 16 is free, there is an advantageous effect that it is possible to prevent the coil spring 16 from being damaged by the operation for twisting the operation shaft 12.

In the present embodiment, as illustrated in FIG. 2B, the first end 16*a* side of the coil spring 16 is fixed to the lower case 11B such that the recessed curved surface of the bearing part 11Ba of the lower case 11B is housed inside the winding diameter of the coil spring 16. As described later, the tip of the first end 121*a* of the operation shaft main body 121 of the operation shaft 12 in the axial direction operates in such a manner as to move within the recessed curved surface of the bearing part 11Ba.

The gripping operation part 13 is, in this example, made of resin. The gripping operation part 13 has a disk-like shape having a larger diameter than that of the operation shaft main body 121 and having a predetermined thickness such that a user can operate the operation shaft 12 easily. The gripping operation part 13 is coupled to the operation shaft main body 121 of the operation shaft 12 at a central portion of the disk-like shape. In the present embodiment, a circuit board 17 is disposed where the axial direction of the operation shaft main body 121 extends in the gripping operation part 13. In the circuit board 17, a capacitor is connected in parallel to the coil 14, thereby constituting the resonant circuit. The configuration of the operation shaft 12 is similar to that of an electronic pen that performs a position indication to the position detection sensor 22 with the tip of the first end 121*a* side of the operation shaft main body 121 in the axial direction serving as a pen tip.

In the present embodiment, as illustrated in FIG. 2A, the gripping operation part 13 includes push buttons 18 and 19 exposed on its upper surface that lays perpendicularly to the axial direction of the operation shaft 12, such that the user can press the push buttons 18 and 19 in the axial direction of the operation shaft 12 while gripping the gripping operation part 13. The exposed operation parts of the push buttons 18 and 19 are in different colors, for example, such that the user can distinguish between them.

The circuit board 17, which is disposed in the gripping operation part 13, includes switches 18S and 19S (omitted in FIGS. 2A and 2B. See FIG. 5 to be described later), which are switched on and off by these push buttons 18 and 19, respectively. These switches 18S and 19S, which are respectively switched on and off by the push buttons 18 and 19, are, in the present embodiment, off in a normal state. When the user presses the push buttons 18 and 19, the switches 18S and 19S are switched on. The switches 18S and 19S are self-returning switches. Thus, when the user stops pressing the push buttons 18 and 19, the switches 18S and 19S return to an off state.

It is noted that the push buttons 18 and 19 are not necessarily self-returning buttons. Instead, the push buttons 18 and 19 may be configured such that, when pressed once, they are locked in this state (switched on), and when pressed again, they are unlocked (switched off).

As described later, the circuit board 17 includes capacitors C1 and C2 (see FIG. 5) whose connections to the resonant circuit are controlled by the switches 18S and 19S, which are switched on and off in response to the push buttons 18 and 19 being pressed, respectively. Further, pressing the push button 18 or 19 changes a resonant frequency of the resonant circuit. In other words, the switches 18S and 19S, which are switched on and off in response to the push buttons 18 and 19 being pressed, respectively, have similar functions to those of side switches of an electronic pen.

The ON operations of the switches 18S and 19S in response to the pressing of the push buttons 18 and 19 can be set and registered in advance in the operation information output device 2 in association with predetermined events. In the present embodiment, the ON operations of the switches 18S and 19S are set and registered to be handled as predetermined operation indication information for a game in the operation information output device 2.

Since the input device 1 according to the present embodiment is configured as described above, the operation shaft 12 is supported in the case 11 by an elastic displacement force of the coil spring 16 in such a manner that the operation shaft main body 121 is positioned perpendicular to the bottom part of the case 11 and the tip of the first end 121*a* side of the operation shaft main body 121 in the axial direction abuts against the central portion of the bearing part 11Ba of the lower case 11B, which constitutes the bottom part of the case 11. In other words, when no tilting force is applied to the gripping operation part 13, the tip of the first end side of the operation shaft 12 is positioned at the central portion of the bearing part 11Ba of the lower case 11B.

When a force for tilting the operation shaft 12 is applied to the gripping operation part 13 in the state in which the operation shaft 12 is supported in the case 11 as described above, the elastic deformation of the coil spring 16 causes the operation shaft 12 to rotate about the rotation-center position, which is between the first end 121*a* side and second end 121*b* side of the operation shaft main body 121 in the axial direction, to be thereby tilted. When the application of the tilting force is released, the elastic returning force of the coil spring 16 causes the operation shaft 12 to return to its original state which is the same state as before the tilting force is applied. This is described with reference to FIG. 3.

Figure 3:
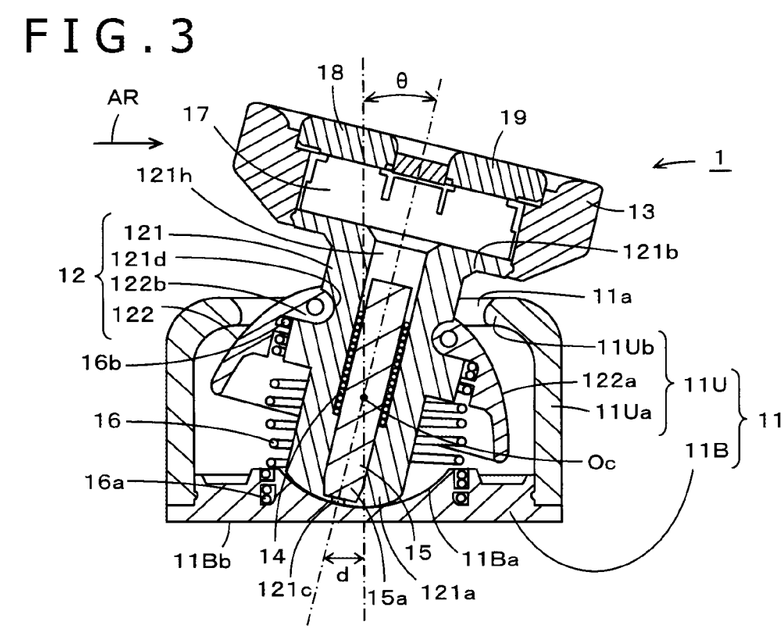
FIG. 3 is a view describing a state in which an operation shaft is tilted in the input device according to the first embodiment of the present disclosure.

FIG. 3 is a view illustrating the state in which the operation shaft 12 is tilted with the gripping operation part 13 of the input device 1 receiving a force in the direction of an arrow AR. Specifically, when a force in the direction of the arrow AR is received, the operation shaft 12 attempts to tilt in the direction in which the force in the direction of the arrow AR is applied. At this time, since the first end and the second end of the coil spring 16 in the axial direction of the coil spring 16 are respectively fixed to the lower case 11B, which constitutes the bottom part of the case 11, and to the operation shaft cover 122 on the second end 121*b* side of the operation shaft main body 121 of the operation shaft 12, the coil spring 16 elastically changes such that the side to which the force in the direction of the arrow AR is applied elastically extends while the side opposite therefrom elastically contracts, as illustrated in FIG. 3. As a result, the operation shaft 12 is tilted in such a manner as to rotate about a position Oc between the first end 16*a* and the second end 16*b* of the coil spring 16. The position Oc, which serves as the rotation center, is located between the first end 121*a* and the second end 121*b* of the operation shaft main body 121 in the axial direction of the operation shaft main body 121.

The position Oc, which serves as the rotation center of the operation shaft 12, does not need to be a predetermined fixed position between the first end 121*a* and the second end 121*b* of the operation shaft main body 121 in the axial direction and may vary slightly depending on the magnitude of the angle of the tilt of the operation shaft 12. However, the shape of the upper case 11U of the case 11 and the shape of the operation shaft 12 are determined such that the operation shaft 12 and the upper case 11U do not rub against each other when the operation shaft 12 is tilted.

When the operation shaft 12 is tilted in this way, as illustrated in FIG. 3, the position of the tip of the first end 121*a* side of the operation shaft main body 121 on the bearing part 11B*a* of the lower case 11B is displaced in such a manner as to move from a central portion of the bearing part 11B*a* in a non-tilting state toward a direction opposite to the direction of the tilt of the second end 121*b* of the operation shaft main body 121 by a distance d corresponding to a tilt angle θ.

In the present embodiment, this positional displacement of the position of the tip of the first end 121*a* side of the operation shaft main body 121 of the operation shaft 12 is detected through the position detection sensor 22, and the operation information output device 2 can thereby acquire output information regarding the direction and the magnitude of the tilt of the operation shaft 12 of the input device 1.

Figure 4:
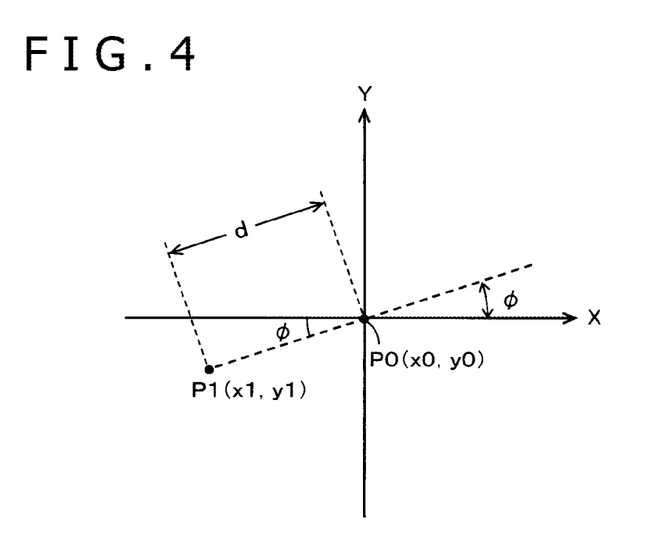
FIG. 4 is a diagram describing a method of calculating a direction and a magnitude of the tilt of the operation shaft in the input system according to the first embodiment of the present disclosure.

For example, as illustrated in FIG. 4, assume that a position P0 of the first end of the operation shaft main body 121 in the axial direction, when the input device 1 is mounted on the input surface 22*a* of the operation information output device 2 and no force for tilting the operation shaft 12 of the input device 1 is applied, is detected as coordinates (x0, y0) through the position detection sensor 22, while a position P1 of the first end of the operation shaft main body 121 in the axial direction when the operation shaft 12 is tilted by the user is detected as coordinates (x1, y1) through the position detection sensor 22. In this case, the direction and the magnitude of the tilt of the operation shaft 12 are detected as follows.

For example, in FIG. 4, the direction of the tilt of the operation shaft 12 is considered in a plane of the X-axis and the Y-axis. In this case, we set a rotation angle φ of the operation shaft 12 to be 0 degrees when the operation shaft 12 is tilted precisely to a positive direction in an X-axial direction, and set a rotation angle φ of the operation shaft 12 to be 180 degrees when the operation shaft 12 is tilted to a negative direction in the X-axial direction. At this time, the direction of the tilt (rotation angle φ) of the operation shaft 12 is opposite to the movement direction of the first end side of the operation shaft main body 121 in the axial direction of the operation shaft main body 121. Therefore, the direction (rotation angle φ) of the tilt of the operation shaft 12 is detected as follows:

When $x1=x0$ and $(y1-y0)>0$, φ=−90 degrees

When $x1=x0$ and $(y1-y0)<0$, φ=90 degrees

When $(x1-x0)>0$ and $(y1-y0)=0$, φ=180 degrees

When $(x1-x0)<0$ and $(y1-y0)=0$, φ=0 degrees

When $(x1-x0)>0$ and $(y1-y0)>0$, $\tan^{-1}(-180 \text{ degrees}-φ)=(y1-y0)/(x1-x0)$ When $(x1-x0)>0$ and $(y1-y0)<0$, $\tan^{-1}(180 \text{ degrees}-φ)=(y1-y0)/(x1-x0)$ When $(x1-x0)<0$ and $(y1-y0)>0$, $\tan^{-1}(-φ)=(y1-y0)/(x1-x0)$ When $(x1-x0)<0$ and $(y1-y0)<0$, $\tan^{-1}φ=(y1-y0)/(x1-x0)$ (Equations 1)

Further, a magnitude d of the tilt in each direction of the tilt is detected as follows.

$$d=\{(x1-x0)^2+(y1-y0)^2\}^{1/2} \quad \text{(Equation 2)}$$

When the tilt angle θ of the operation shaft is less than 30 degrees, an increase in the tilt angle θ increases the distance d approximately in proportion to the tilt angle θ due to the relation between tan θ and the distance d. Therefore, calculating the distance d means calculating the magnitude of the tilt angle θ.

Examples of Electrical Configurations of Input Device 1 and Operation Information Output Device 2

Figure 5:
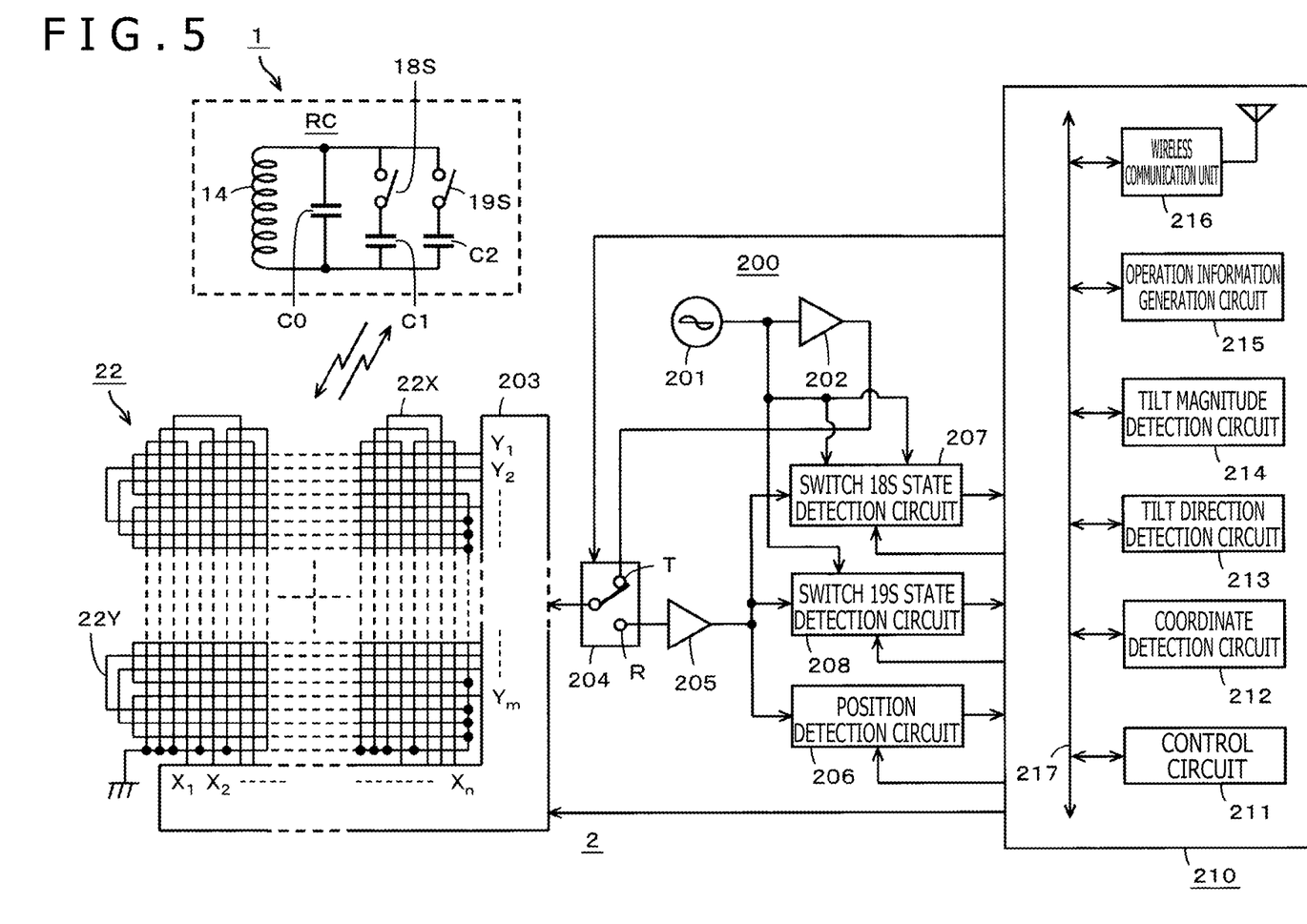
FIG. 5 is a diagram describing an example of an electrical configuration of the input system according to the first embodiment of the present disclosure.

Next, examples of electrical configurations of the input device 1 and the operation information output device 2 are described. FIG. 5 is a diagram illustrating an example of the electrical configuration of the input device 1 and an example of the electrical configuration of the operation information output device 2.

Example of Electrical Configuration of Input Device 1

As described above, a resonant circuit RC for performing electromagnetic induction coupling with the position detection sensor 22 is formed on the circuit board 17 of the input device 1. The resonant circuit RC is configured such that a resonant capacitor C0 is connected in parallel to the coil 14, which is wound around the ferrite core 15. In the resonant circuit RC, a series circuit including the switch 18S, which is switched on and off by the push button 18, and the capacitor C1, as well as a series circuit including the switch 19S, which is switched on and off by the push button 19, and the capacitor C2, are respectively connected in parallel to the coil 14.

When the push button 18 is pressed and the switch 18S is switched on, the capacitor C1 is further connected in parallel to a parallel resonant circuit including the coil 14 and the capacitor C0, and a resonant frequency (phase) of the resonant circuit RC changes.

Similarly, when the push button 19 is pressed and the switch 19S is switched on, the capacitor C2 is further connected in parallel to the parallel resonant circuit including the coil 14 and the capacitor C0, and the resonant frequency (phase) of the resonant circuit RC changes.

In this case, the capacitances of the capacitors C1 and C2 are different from each other. That is, the resonant frequency (phase) of the resonant circuit RC when the push button 18 is pressed and the switch 18S is switched on is different from the resonant frequency (phase) of the resonant circuit RC when the push button 19 is pressed and the switch 19S is switched on. Therefore, the operation information output device 2 detects whether the push button 18 or the push button 19 is pressed, by detecting the difference in the resonant frequency of the resonant circuit of the input device 1.

Example of Electrical Configuration of Operation Information Output Device 2

As illustrated in FIG. 5, the operation information output device 2 includes the position detection sensor 22, a position detection circuit 200, and an information processing circuit 210. The position detection sensor 22 includes an X-axial direction loop coil group 22X and a Y-axial direction loop coil group 22Y, which are stacked on a thin substrate. The X-axial direction loop coil group 22X includes a plurality of loop coils arranged at a predetermined pitch in a lateral direction (X-axial direction) of the input surface 22a. The Y-axial direction loop coil group 22Y includes a plurality of loop coils arranged at a predetermined pitch in a longitudinal direction (Y-axial direction) of the input surface 22a.

The position detection circuit 200 includes an oscillator 201, a current driver 202, a selection circuit 203, a switching connection circuit 204, a reception amplifier 205, a position detection circuit 206, a switch 18S state detection circuit 207, and a switch 19S state detection circuit 208. A detection output from the position detection circuit 206 of the position detection circuit 200, a detection output from the switch 18S state detection circuit 207 of the position detection circuit 200, and a detection output from the switch 19S state detection circuit 208 of the position detection circuit 200 are supplied to the information processing circuit 210.

The information processing circuit 210 includes a control circuit 211, which includes a microprocessor, and controls the operation of the position detection circuit 200 by using the control circuit 211. Specifically, the control circuit 211 of the information processing circuit 210 controls the selection of a loop coil in the selection circuit 203 of the position detection circuit 200, the switching in the switching connection circuit 204, and a processing timing in each of the position detection circuit 206, the switch 18S state detection circuit 207, and the switch 19S state detection circuit 208.

The X-axial direction loop coil group 22X and the Y-axial direction loop coil group 22Y of the position detection sensor 22 are connected to the selection circuit 203. The selection circuit 203 sequentially selects one loop coil among the two loop coil groups 22X and 22Y under the control by the control circuit 211 of the information processing circuit 210.

The oscillator 201 generates an alternating-current (AC) signal with a frequency f0 equal to the resonant frequency of the resonant circuit RC of the input device 1 (resonant frequency of the resonant circuit including the coil 14 and the capacitor C0). The oscillator 201 supplies the generated AC signal to the current driver 202, the switch 18S state detection circuit 207, and the switch 19S state detection circuit 208. The current driver 202 converts the AC signal supplied from the oscillator 201 into a current and supplies the current to the switching connection circuit 204.

Under the control from the control circuit 211 of the information processing circuit 210, the switching connection circuit 204 switches a connection destination (a transmission-side terminal T or a reception-side terminal R) to which the loop coil selected by the selection circuit 203 is connected. The current driver 202 is connected to the transmission-side terminal T, and the reception amplifier 205 is connected to the reception-side terminal R. When the position detection sensor 22 transmits a signal, the switching connection circuit 204 is switched to the transmission-side terminal T. When the position detection sensor 22 receives a signal from the input device 1, the switching connection circuit 204 is switched to the reception-side terminal R.

When the switching connection circuit 204 is switched to the transmission-side terminal T, a current from the current driver 202 is supplied to the loop coil selected by the selection circuit 203. This generates a magnetic field in the loop coil, thereby transmitting a signal (radio wave) to act on the resonant circuit RC of the input device 1.

When the switching connection circuit 204 is switched to the reception-side terminal R, an induction voltage generated in the loop coil selected by the selection circuit 203 is supplied to the reception amplifier 205 via the selection circuit 203 and the switching connection circuit 204. The reception amplifier 205 amplifies the induction voltage supplied from the loop coil and supplies the amplified induction voltage to the position detection circuit 206, the switch 18S state detection circuit 207, and the switch 19S state detection circuit 208.

An induction voltage is generated in each of the loop coils of the X-axial direction loop coil group 22X and the Y-axial direction loop coil group 22Y by the radio wave transmitted (returned) from the resonant circuit RC of the input device 1.

With respect to the resonant frequency of the resonant circuit RC of the input device 1, the position detection circuit 206 detects the induction voltage generated in the loop coil, that is, a received signal, converts the detected received signal into a digital signal, and outputs the digital signal to the information processing circuit 210.

The switch 18S state detection circuit 207 detects the received signal from the reception amplifier 205 in synchronization with the AC signal from the oscillator 201. On the basis of the frequency displacement (phase difference) of both signals, the switch 18S state detection circuit 207 detects that the resonant frequency (phase) of the resonant circuit RC changes in response to the switch 18S of the input device 1 being switched on. On the basis of the detection result, the switch 18S state detection circuit 207 detects the switch state indicating whether the push button 18 of the input device 1 is pressed and the switch 18S is switched on or the switch 18S remains off, and outputs the detection output to the information processing circuit 210.

Similarly, the switch 19S state detection circuit 208 detects that the resonant frequency (phase) of the resonant circuit RC changes in response to the switch 19S being switched on. On the basis of the detection result, the switch 19S state detection circuit 208 detects the switch state indicating whether the push button 19 of the input device 1 is pressed and the switch 19S is switched on or the switch 19S remains off, and outputs the detection output to the information processing circuit 210.

The information processing circuit 210 has not only the function of controlling the operation of the position detection circuit 200 as described above, but also, in the present embodiment, the function of detecting, on the basis of the output from the position detection circuit 200, the direction and the magnitude of the tilt of the operation shaft 12 of the input device 1 corresponding to an operation of tilting the operation shaft 12.

In order to realize the functions of the information processing circuit 210, a coordinate detection circuit 212, a tilt direction detection circuit 213, a tilt magnitude detection circuit 214, an operation information generation circuit 215, and a wireless communication unit 216 are connected to the control circuit 211 through a system bus 217. The coordinate detection circuit 212, the tilt direction detection circuit 213, the tilt magnitude detection circuit 214, and the operation information generation circuit 215 can also be configured as a software functional section implemented by the control circuit 211 executing a defined program.

The coordinate detection circuit 212 calculates coordinate values of the position of the first end side of the operation shaft main body 121 of the operation shaft 12 of the input device 1 in the axial direction on the basis of voltage value level of the induction voltage generated in each loop coil detected by the position detection circuit 206 and supplies the calculated coordinate values to the tilt direction detection circuit 213 and the tilt magnitude detection circuit 214.

The tilt direction detection circuit 213 calculates the direction in which the operation shaft 12 of the input device 1 is tilted, by performing computing according to (Equations 1) described above using the acquired coordinate values, and supplies information regarding the calculated direction of the tilt to the operation information generation circuit 215.

The tilt magnitude detection circuit 214 calculates the magnitude of the tilt of the operation shaft 12 of the input device 1 by performing computing according to (Equation 2) described above using the acquired coordinate values, and supplies information regarding the calculated magnitude of the tilt to the operation information generation circuit 215.

The operation information generation circuit 215 generates operation information including the information regarding the direction of the tilt received from the tilt direction detection circuit 213, the information regarding the magnitude of the tilt received from the tilt magnitude detection circuit 214, the state information indicating on/off of the switch 18S received from the switch 18S state detection circuit 207, and the state information indicating on/off of the switch 19S received from the switch 19S state detection circuit 208.

The operation information generated by the operation information generation circuit 215 is transmitted to a game machine main unit or a personal computer through the wireless communication unit 216 under the control by the control circuit 211. The wireless communication unit 216 is, in this example, configured as a near-field communication unit in accordance with the Bluetooth (registered trademark) standard. Without being limited thereto, the wireless communication unit 216 may be configured as, for example, a Wi-Fi (registered trademark) wireless communication unit.

In this case, in a game machine main unit or a personal computer, the information regarding the direction of the tilt, the information regarding the magnitude of the tilt, the state information indicating on/off of the switch 18S, and the state information indicating on/off of the switch 19S are each assigned to a predetermined operation, for example, for progressing the game, and the game progress is controlled according to each information.

Example of Flow of Operation of Information Processing Circuit 210

An example of a flow of an operation of the information processing circuit 210 of the operation information output device 2 configured as described above is described with reference to a flowchart of FIG. 6 and a flowchart of FIG. 7, which is a continuation of FIG. 6. In the following description, it is assumed that the control circuit 211 of the information processing circuit 210 implements the functions of the coordinate detection circuit 212, the tilt direction detection circuit 213, the tilt magnitude detection circuit 214, and the operation information generation circuit 215 by executing a program which embodies software functional processing.

Figure 6:
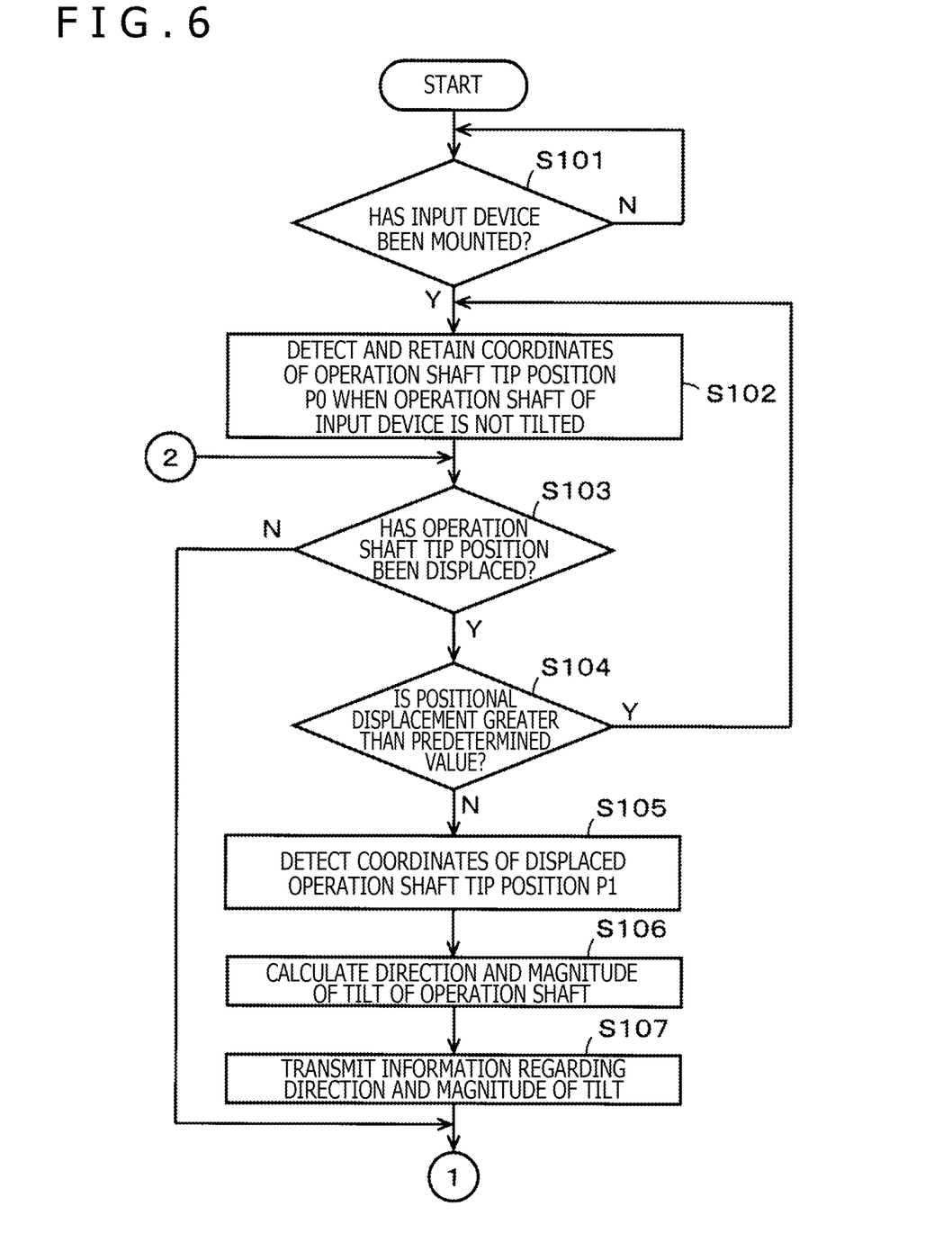
FIG. 6 is a diagram illustrating a part of a flowchart indicating an example of a flow of an operation of an information processing circuit of an operation information output device in the input system according to the first embodiment of the present disclosure.

When the operation information output device 2 is powered on, the processing starts from "start" of FIG. 6. First, the control circuit 211 determines whether or not the input device 1 has been mounted on the input surface 22a, by monitoring the state of interaction through electromagnetic coupling between the resonant circuit RC of the input device 1 and the position detection sensor 22 (step S101). When the control circuit 211 determines in step S101 that the input device 1 has not been mounted on the input surface 22a, the control circuit 211 continues the monitoring in step S101.

When the control circuit 211 determines in step S101 that the input device 1 has been mounted on the input surface 22a, the control circuit 211 detects the coordinate values of the position P0 (see FIG. 4) of the first end of the operation shaft main body 121 in the axial direction when the operation shaft 12 of the input device 1 is not tilted, and retains the detected coordinate values (step S102). The position of the first end of the operation shaft main body 121 in the axial direction is hereinafter referred to as an operation shaft tip position.

Next, the control circuit 211 determines whether or not the operation shaft tip position of the input device 1 has been displaced (step S103). When the control circuit 211 determines that the operation shaft tip position has been displaced, the control circuit 211 determines whether or not the magnitude of the positional displacement is greater than a predetermined value (step S104). The predetermined value is, for example, greater than the radius of the winding diameter of the coil spring 16 corresponding to the maximum tilt displacement of the operation shaft 12 of the input device 1.

When the control circuit 211 determines in step S104 that the positional displacement is greater than the predetermined value, the control circuit 211 determines that the position at which the input device 1 is mounted on the input surface 22a has changed. In this case, the control circuit 211 returns the processing to step S102 and repeats the processing from step S102 onward.

When the control circuit 211 determines in step S104 that the positional displacement is equal to or less than the predetermined value, the control circuit 211 determines that an operation of tilting the operation shaft 12 of the input device 1 has been performed, and detects the coordinate values of the position P1 (see FIG. 4), which is the position after the displacement of the operation shaft tip position of the input device 1 (step S105).

Next, from the retained operation shaft tip position P0 of the input device 1 and the operation shaft tip position P1 of the tilted operation shaft 12 of the input device 1 that has been detected in step S105, the control circuit 211 calculates the direction of the tilt of the operation shaft 12 of the input device 1 on the basis of the above-described (Equations 1) and calculates the magnitude of the tilt of the operation shaft 12 of the input device 1 on the basis of the above-described (Equation 2) (step S106).

The control circuit 211 then transmits the information regarding the calculated direction and the magnitude of the tilt of the operation shaft 12 to the game machine main unit or the personal computer through the wireless communication unit 216 (step S107).

Figure 7:
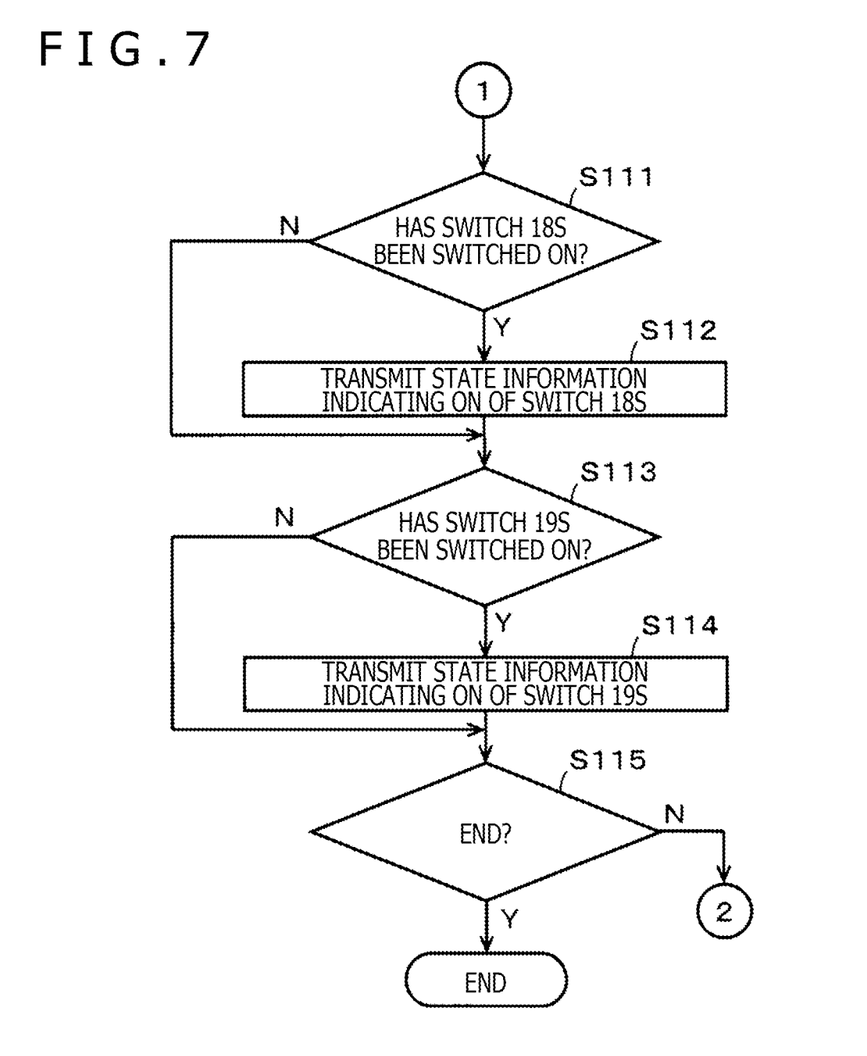
FIG. 7 is a diagram illustrating a part of the flowchart indicating the example of the flow of the operation of the information processing circuit of the operation information output device in the input system according to the first embodiment of the present disclosure.

Next, the control circuit 211 monitors the state detection output from the switch 18S state detection circuit 207 to determine whether or not the push button 18 has been pressed and the switch 18S has been switched on (step S111 of FIG. 7). Even when the control circuit 211 determines in step S103 that the operation shaft tip position of the input device 1 has not been displaced, the control circuit 211 causes the processing to jump from step S103 to step S111 to determine whether or not the switch 18S has been switched on.

When the control circuit 211 determines in step S111 that the switch 18S has been switched on, the control circuit 211 transmits state information indicating that the switch 18S has been switched on to the game machine main unit or the personal computer through the wireless communication unit 216 (step S112).

When the control circuit 211 determines in step S111 that the switch 18S has not been switched on or after the processing in step S112, the control circuit 211 monitors the state detection output from the switch 19S state detection circuit 208 to determine whether or not the push button 19 has been pressed and the switch 19S has been switched on (step S113).

When the control circuit 211 determines in step S113 that the switch 19S has been switched on, the control circuit 211 transmits state information indicating that the switch 19S has been switched on to the game machine main unit or the personal computer through the wireless communication unit 216 (step S114).

When the control circuit 211 determines in step S113 that the switch 19S has not been switched on or after the processing in step S114, the control circuit 211 determines whether or not an operation of ending the processing for an operation input using the input device 1 has been performed, such as an operation of turning off a power switch of the operation information output device 2 (step S115).

When the control circuit 211 determines in step S115 that the operation of ending the processing has not been performed, the control circuit 211 returns the processing to step S103 and repeats the processing from step S103 onward. When the control circuit 211 determines in step S115 that the operation of ending the processing has been performed, the control circuit 211 ends this processing routine.

When the input device 1 is detached from the input surface 22a of the operation information output device 2, and thus the position detection circuit 206 is unable to detect the operation shaft tip position of the input device 1 for longer than a predetermined period of time, the control circuit 211 may end the processing and turn off the power switch of the operation information output device 2.

In the input system according to the embodiment described above, the operation information output device 2 detects, through the position detection sensor 22, a positional change corresponding to the tilt of the first end side of the operation shaft 12 in the axial direction of the operation shaft 12 housed in the case 11 of the input device 1, calculates the direction and the magnitude of the tilt of the operation shaft 12 on the basis of the detected positional change, and outputs them as the operation information.

Although conventional input devices require a complex mechanism for detecting the tilt of the operation shaft, the input device 1 with the configuration described above eliminates the need for such a complex mechanism and has a simple configuration. Therefore, malfunction due to breakage of mechanical parts that conventional input devices face is less likely to occur in the input device 1 according to the embodiment described above.

In the input system according to the embodiment described above, the input device 1 is configured to house, in the operation shaft, the coil that constitutes the resonant circuit, and the operation information output device 2 is configured separately from the input device 1 to include the position detection sensor 22 that electromagnetically couples with the coil of the resonant circuit of the input device 1. Thus, the user can use the input device 1 by mounting the input device 1 at any position on the input surface 22a of the operation information output device 2. This configuration increases usability of the input device 1.

Further, there is an advantage that a general position detection sensor of the electromagnetic induction system can be used as it is as the position detection sensor 22 of the operation information output device 2.

Further, there is an advantage that the resolution of the detection of the direction and the magnitude of the tilt of the operation shaft 12 can be increased easily by reducing the formation pitch of the loop coils of the position detection sensor 22.

In the input device 1 according to the embodiment described above, the push buttons 18 and 19 are disposed on the upper surface of the gripping operation part 13, which is attached to the second end side of the operation shaft 12. The upper surface of the gripping operation part 13 is located perpendicularly to the axial direction of the operation shaft 12. This configuration provides advantageous effects that the user can press the gripping operation part 13 in the axial direction of the operation shaft 12 while gripping the gripping operation part 13, and even when tilting the operation shaft 12, the user can operate the push buttons 18 and 19 easily.

In addition, since the operation information output device 2 according to the embodiment described above employs a position detection method using the position detection sensor of the electromagnetic induction system, very fine displacement is detectable. Moreover, since the direction and the magnitude of the tilt are calculated on the basis of the detected displacement, there is an advantageous effect that the resolution is higher than that of conventional methods.

In the embodiment described above, the operation information output device 2 is specifically configured to detect the direction and the magnitude of the tilt of the operation shaft 12 of the input device 1 (dedicated for use with the input device 1). However, the operation information output device 2 can also be used as a device to detect the position indicated by an electronic pen of a general electromagnetic induction system.

The operation information output device in such case has a first mode in which the direction and the magnitude of the tilt of the operation shaft 12 of the input device 1 are detected and a second mode in which the position indicated by a position indicator, for example, an electronic pen, of the general electromagnetic induction system is detected. In the first mode, the operation information output device performs an operation similar to the operation described above. In the second mode, the operation information output device detects the coordinates of the position indicated by the electronic pen and detected by the position detection circuit 206 of the position detection circuit 200, by using the coordinate detection circuit 212 of the information processing circuit 210, and transmits the coordinates to a personal computer or the like through the wireless communication unit 216, for example.

In this case, the operation information output device may include a mode switching button to allow the user to switch between the first mode and the second mode. Further, each of the electronic pen and the input device may include a function of transmitting identification information to the operation information output device through the position detection sensor or through a near-field communication unit in accordance with the Bluetooth (registered trademark) standard, and the operation information output device may have a function of receiving the identification information of each of the electronic pen and the input device. When the operation information output device receives the identification information of the input device, the operation information output device may automatically switch to the first mode. When the operation information output device receives the identification information of the electronic pen, the operation information output device may automatically switch to the second mode.

Second Embodiment

In the first embodiment described above, the input system includes the input device and the operation information output device. Alternatively, the input device may include a position detection sensor and an information processing circuit so that the input device can be configured as a stand-alone device.

Figure 8:
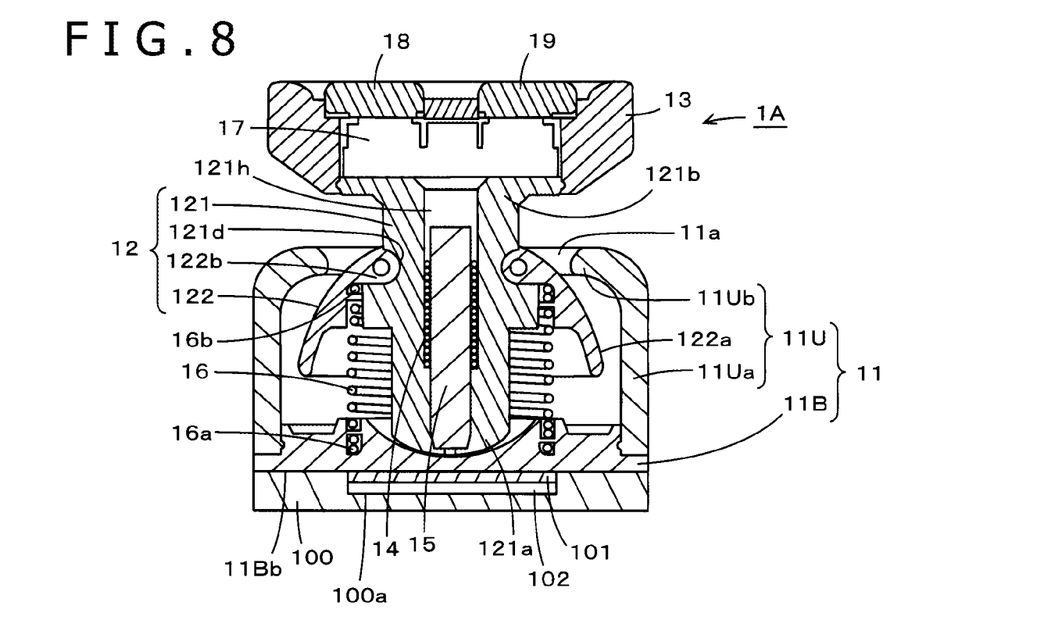
FIG. 8 is a view describing an example of a configuration of an input device according to a second embodiment of the present disclosure.

FIG. 8 illustrates an input device 1A according to a second embodiment, which has the configuration described above. Configuration parts similar to those of the input device 1 according to the first embodiment described above are denoted with the same reference signs, and detailed descriptions thereof are omitted.

In the input device 1A according to the second embodiment, a bottom plate 100 is attached under the bottom surface 11Bb of the lower case 11B of the input device 1 according to the first embodiment described above. In the bottom plate 100, a position detection sensor 101 and a circuit board 102 are housed. In the circuit board 102, a position detection circuit and an information processing circuit (not illustrated) having configurations similar to those of the position detection circuit 200 and the information processing circuit 210 are mounted.

The input device 1A according to the second embodiment can use the input device 1 according to the first embodiment described above as it is. However, unlike the first embodiment described above, the bottom surface 11Bb of the lower case 11B according to the second embodiment does not need to have a predetermined friction with the input surface 22a of the operation information output device 2.

In the second embodiment, a square recess 100a whose one side slightly larger in length than the diameter of a circular region of the bearing part 11Ba of the recessed curved surface of the lower case 11B is formed in a central portion of the bottom plate 100. In this recess 100a, the position detection sensor 101 is disposed immediately under the bottom surface 11Bb of the lower case 11B. The position detection sensor 101 has a square shape whose one side equal to or slightly larger in length than the diameter of the circular region of the bearing part 11Ba of the recessed curved surface of the lower case 11B. The circuit board 102 is disposed under the position detection sensor 101 in the recess 100a.

In the input device 1A according to the present embodiment, the recess 100a, the position detection sensor 101, and the circuit board 102 may have a circular shape with a diameter equal to or slightly larger than the diameter of the circular region of the bearing part 11Ba of the recessed curved surface of the lower case 11B.

In the input device 1A according to the present embodiment, when the user performs an operation in such a manner as to tilt the operation shaft 12 by using the gripping operation part 13, the positional displacement of the tip of the first end 121a side of the operation shaft main body 121 of the operation shaft 12 is detected in the position detection circuit 200 and the information processing circuit 210 in the circuit board 102 through the position detection sensor 101, and the direction and the magnitude of the tilt of the operation shaft 12 are calculated from the positional displacement. Further, information regarding the direction and the magnitude of the tilt of the operation shaft 12 is transmitted from the input device 1A to a game machine main unit or a personal computer through the wireless communication unit. When the push button 18 or the push button 19 is pressed, the state information indicating ON of the switch 18S or the state information indicating ON of the switch 19S is transmitted to the game machine main unit or the personal computer through the wireless communication unit.

Needless to say, the input device 1A according to the second embodiment can also be configured to transmit the information regarding the direction and the magnitude of the tilt of the operation shaft 12, the state information indicating ON of the switch 18S, and the state information indicating ON of the switch 19S not through wireless communication but through wired communication using a cable.

In the configuration of the input device 1A according to the second embodiment, the input device and the position detection sensor can also be configured to perform signal interaction through coupling using a capacitive system, especially an active capacitive system.

Other Embodiments or Modifications

In the input devices 1 and 1A according to the embodiments described above, the coil spring 16 not only supports the operation shaft 12 but also serves as an elastic return member to return the operation shaft 12 to the original state. However, needless to say, a support member of the operation shaft 12 and an elastic return member that returns the operation shaft 12 to the original state can be provided separately.

Figure 9:
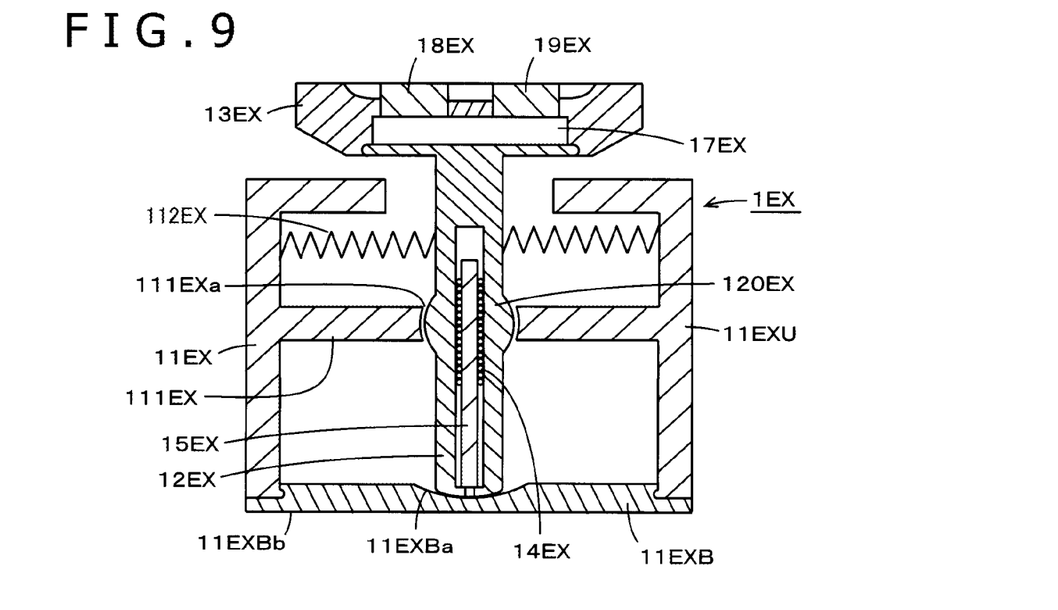
FIG. 9 is a view describing an example of a configuration of an input device according to another embodiment of the present disclosure.

To that end, FIG. 9 is a view illustrating a main configuration of an input device 1EX configured accordingly. As with the input device 1 according to the first embodiment, the input device 1EX is an example of configuring an input system together with the operation information output device 2.

As with the input devices according to the embodiments described above, a coil 14EX, which is wound around a ferrite core 15EX, is housed in an operation shaft 12EX of the input device 1EX according to this example. As with the input devices according to the embodiments described above, a first end side of the operation shaft 12EX has a convex curved surface and abuts against a recessed curved surface of a bearing part 11EXBa of a lower case 11EXB of a case 11EX.

A spherical bulge 120EX is formed in approximately a central portion of the axial direction of the operation shaft 12EX of the input device 1EX according to this example. An upper case 11EXU of the case 11EX includes a support part 111EX for supporting the operation shaft 12EX at the spherical bulge 120EX. The support part 111EX has a through hole 111EXa, which has a recessed surface corresponding to a sphere of the spherical bulge 120EX of the operation shaft 12EX. With this configuration, the operation shaft 12EX can rotate about the spherical bulge 120EX, which serves as a rotation center, so that the operation shaft 12EX can be tilted.

In the input device 1EX according to this example, an elastic member 112EX, such as a coil spring, is disposed between the upper case 11EXU of the case 11EX and the operation shaft 12EX, at a position closer to the first end side or the second end side of the operation shaft 12EX (closer to the second end side in the example of FIG. 9) with respect to the spherical bulge 120EX in the axial direction of the operation shaft 12EX. Thus, the axial direction of the operation shaft 12EX is always elastically supported in such a manner as to remain perpendicular to a bottom surface 11EXBb of the lower case 11EXB inside.

With this configuration, when the operation shaft 12EX is tilted using a gripping operation part 13EX and then a force for tilting the operation shaft 12EX is released, the operation shaft 12EX returns to its original state by the elastic member 112EX.

In this example, as with the input devices according to the embodiments described above, the gripping operation part 13EX includes a circuit board 17EX and push buttons 18EX and 19EX, thereby constituting a resonant circuit including a capacitor disposed in the circuit board 17EX.

Although the case of each of the input devices 1A, 1B, and 1EX according to the embodiments described above has a cylindrical shape, each of the input devices 1A, 1B, and 1EX may have an elongated shape with a polygonal cross-section, without being limited to the columnar shape.

It is to be noted that the embodiments of the present disclosure are not limited to the foregoing embodiments, and that various changes can be made without departing from the present disclosure.

The invention claimed is:

1. An input device comprising:
   an operation shaft;
   a case configured to house the operation shaft to permit a tilting operation to tilt an axial direction of the operation shaft to a desired direction; and
   a coil constituting a resonant circuit for performing signal interaction through electromagnetic induction coupling with a position detection sensor, which is housed in the operation shaft such that a direction of magnetic flux penetrating the coil is in the axial direction of the operation shaft;
   wherein,
   the operation shaft is configured to be tiltable to a desired direction within the case, with a predetermined position between a first end side and a second end side of the operation shaft in the axial direction of the operation shaft serving as a rotation center, so that a direction of tilt of the operation shaft and a magnitude of an angle of the tilt are detected on a basis of a positional displacement of the first end side of the operation shaft detected via the position detection sensor through the signal interaction.

2. The input device according to claim 1, further comprising:
   an elastic return member that, when an operation force for tilting the operation shaft is released, causes the operation shaft to elastically return to a state in which the operation force for tilting the operation shaft has not yet been applied.

3. The input device according to claim 1, wherein the coil is wound around a magnetic core, and a first end side of the magnetic core in an axial direction of the magnetic core is positioned near an edge of the first end side of the operation shaft.

4. The input device according to claim 1, wherein,
   a gripping operation part that allows a user to perform the tilting operation to tilt the operation shaft is disposed on the second end side of the operation shaft,
   the gripping operation part includes a circuit board, and the circuit board includes a first capacitor electrically connected to the coil to constitute the resonant circuit.

5. The input device according to claim 4, wherein,
   the gripping operation part includes one or more switches that are operable by the user, and
   the circuit board includes one or more second capacitors whose connections to the resonant circuit are controlled in response to the one or more switches being switched on or off.

6. The input device according to claim 1, wherein,
   the coil is housed in the operation shaft such that a position of the first end side of the operation shaft is detectable through the position detection sensor,
   the case includes an upper part and a bottom part facing each other via a hollow space,
   the upper part has an opening, and
   the operation shaft is supported in the case such that:
     the first end side in the axial direction is movably supported on the bottom part of the case with the second end side in the axial direction protruding out of the case through the opening, and,
     when an operation force for tilting the operation shaft is applied to the second end side in the axial direction, the operation shaft rotates about the predetermined position serving as the rotation center and is thereby tilted in the hollow space of the case, and the position of the first end side of the operation shaft changes on the bottom part of the case.

7. The input device according to claim 6, wherein,
   an edge of the first end side of the operation shaft has a convex curved surface with a predetermined first curvature, and
   a bearing part having a recessed curved surface with a second curvature that is same as or greater than the first curvature is formed on the bottom part of the case.

8. The input device according to claim 7, wherein each of the convex curved surface and the recessed curved surface is spherical.

9. The input device according to claim 6, wherein an umbrella-shaped operation shaft cover part overhanging in a direction intersecting the axial direction of the operation shaft is formed in an inner part of the case on the second end side of the operation shaft such that the upper part of the case does not rub against the operation shaft when the operation shaft is tilted.

10. The input device according to claim 6, wherein,
    a coil spring is disposed such that the operation shaft is housed inside the coil spring, and a first end side of the coil spring is fixedly attached to the bottom part of the case, and
    the coil spring supports the operation shaft within the case and causes the operation shaft to elastically return to a state in which the operation force for tilting the operation shaft has not yet been applied.

11. The input device according to claim 10, wherein,
    an umbrella-shaped operation shaft cover part overhanging in a direction intersecting the axial direction of the operation shaft such that the upper part of the case does not rub against the operation shaft when the operation shaft is tilted is coupled to the operation shaft in an inner part of the case on the second end side of the operation shaft such that the operation shaft cover part and the operation shaft are freely rotatable about the axial direction serving as a central axis, and
    a second end side of the coil spring is fixed to the operation shaft cover part.

12. The input device according to claim 6, wherein,
    the position detection sensor is disposed in the bottom part of the case, and a detection circuit is disposed in the bottom part of the case, wherein the detection circuit is configured to detect, from a detection output based on the signal interaction through the electromagnetic induction coupling between the position detection sensor and the resonant circuit, the direction of the tilt of the operation shaft on a basis of a change in the position of the first end side of the operation shaft on the position detection sensor.

13. The input device according to claim 12, wherein the detection circuit detects, from the detection output based on the signal interaction through the electromagnetic induction coupling between the position detection sensor and the resonant circuit, the direction of the tilt of the operation shaft and the magnitude of the angle of the tilt of the operation shaft on the basis of the change in the position of the first end side of the operation shaft on the position detection sensor.

14. An input system comprising:
an input device; and
an operation information output device including an input surface on which the input device is mounted,
wherein,
the operation information output device includes a position detection sensor of an electromagnetic induction system and a position detection region of the position detection sensor serves as the input surface,
the input device includes:
an operation shaft,
a case configured to house the operation shaft such that an operation of tilting an axial direction of the operation shaft to a desired direction can be performed, and
a coil constituting a resonant circuit for performing signal interaction through electromagnetic induction coupling with the position detection sensor, which is housed in the operation shaft such that a direction of magnetic flux penetrating the coil is in the axial direction of the operation shaft,
wherein,
the operation shaft is configured to be tiltable to a desired direction within the case, with a predetermined position between a first end side and a second end side of the operation shaft in the axial direction of the operation shaft serving as a rotation center, and
the operation information output device includes a detection circuit that detects a position of the first end side of the operation shaft on the position detection sensor from a detection output based on the signal interaction through the electromagnetic induction coupling between the position detection sensor and the resonant circuit, and detects a direction of tilt of the operation shaft on a basis of a change in the detected position.

15. The input system according to claim 14, wherein the input device includes an elastic return member that, when an operation force for tilting the operation shaft is released, causes the operation shaft to elastically return to a state in which the operation force for tilting the operation shaft has not yet been applied.

16. The input system according to claim 14, wherein the detection circuit of the operation information output device detects the direction of the tilt of the operation shaft and a magnitude of an angle of the tilt of the operation shaft on the basis of the change in the detected position.

17. The input system according to claim 14, wherein the input surface of the operation information output device has a region range larger than a region range of a bottom part of the input device, and the input device is mountable at any position on the input surface.

18. The input system according to claim 14, wherein,
the operation information output device has a first mode for the input device and a second mode for detecting a position indicated by a position indicator other than the input device, and
the detection circuit operates when the operation information output device is in the first mode.

19. The input system according to claim 18, wherein,
the input device includes a transmission unit that transmits identification information to the operation information output device, and
when the operation information output device receives the identification information from the input device, the operation information output device activates the first mode, and the detection circuit detects, from the detection output based on the signal interaction through the electromagnetic induction coupling with the resonant circuit, the direction of the tilt of the operation shaft on the basis of the change in the position of the first end side of the operation shaft on the position detection sensor.

* * * * *